(12) United States Patent
Costabel

(10) Patent No.: US 8,752,260 B2
(45) Date of Patent: Jun. 17, 2014

(54) HOLDING DEVICE

(75) Inventor: Sascha Costabel, Otisheim (DE)

(73) Assignee: SFS Intec Holding AG, Heerbrugg (CH)

( * ) Notice: Subject to any disclaimer, the term of this patent is extended or adjusted under 35 U.S.C. 154(b) by 163 days.

(21) Appl. No.: 13/133,478

(22) PCT Filed: Apr. 9, 2010

(86) PCT No.: PCT/EP2010/054695
§ 371 (c)(1),
(2), (4) Date: Jun. 8, 2011

(87) PCT Pub. No.: WO2010/118987
PCT Pub. Date: Oct. 21, 2010

(65) Prior Publication Data
US 2011/0239427 A1    Oct. 6, 2011

(30) Foreign Application Priority Data

Apr. 14, 2009    (DE) .......................... 10 2009 017 339

(51) Int. Cl.
  *B25B 27/14*    (2006.01)
(52) U.S. Cl.
  USPC .......... 29/281.1; 269/254 CS; 16/267; 16/268
(58) Field of Classification Search
  USPC .............. 29/281.1; 24/371; 16/86.1, 86.2, 50,
     16/87 R, 93 R, 94, 232, 254, 255, 256, 257,
     16/268, 378, 277, 304
  See application file for complete search history.

(56) References Cited

U.S. PATENT DOCUMENTS

| 2,430,942 A | * | 11/1947 | McGiff | 16/229 |
| 2,640,237 A | * | 6/1953 | Vaisey | 24/371 |
| 4,561,147 A | * | 12/1985 | Katoh et al. | 16/380 |
| 5,222,260 A | * | 6/1993 | Piper | 4/246.1 |

FOREIGN PATENT DOCUMENTS

| DE | 3244041 | 5/1984 |
| DE | 4130823 | 3/1993 |
| DE | 10063035 | 6/2002 |
| DE | 202005020824 | 10/2006 |
| EP | 1215082 | 6/2002 |

OTHER PUBLICATIONS

"Cabin Development—Approach for A350—Cabin Customization,", One (magazine), German edition, Dec. 18, 2006, p. 23.

* cited by examiner

*Primary Examiner* — Lee D Wilson
*Assistant Examiner* — Jamal Daniel
(74) *Attorney, Agent, or Firm* — Volpe and Koenig, P.C.

(57) ABSTRACT

A holding device (10) is provided for use during the installation of a component (60) to be fastened vertically to a support structure (50) such as that of an aircraft, for example a cabin sidewall lining part. The holding device (10) includes a hook (12) and an eyelet (14) receiving the hook, the hook and eyelet being designed so that they can be fastened to the support structure (50) or the component (60). The eyelet (14) has at least one elastically resilient element for the movable mutual support of the eyelet (14) and hook (12). The holding device (10) facilitates the fastening of a perpendicularly installed component (60). The elastically resilient element allows the component (60) to be pre-positioned in a nominal position.

5 Claims, 4 Drawing Sheets

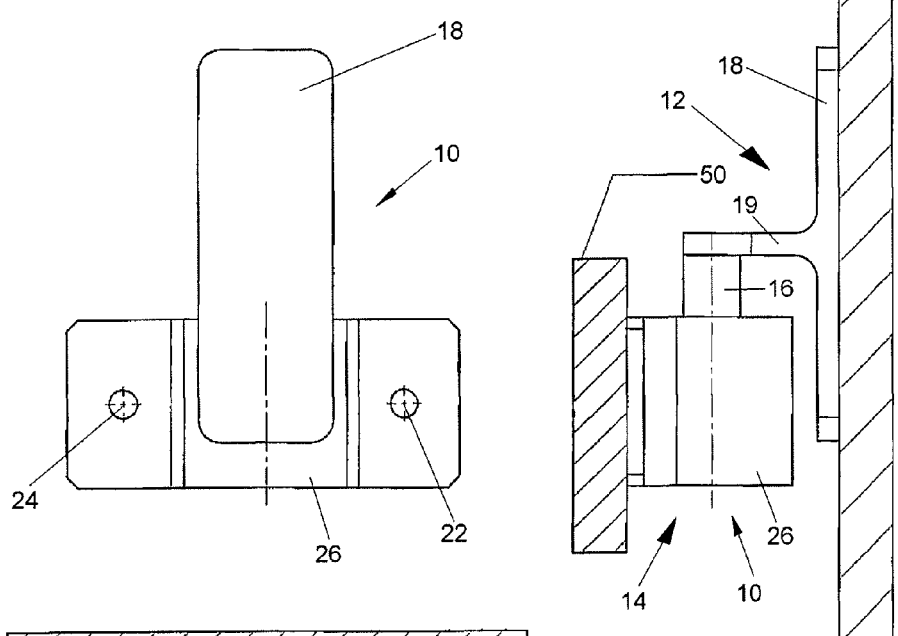
Fig. 5
Fig. 7
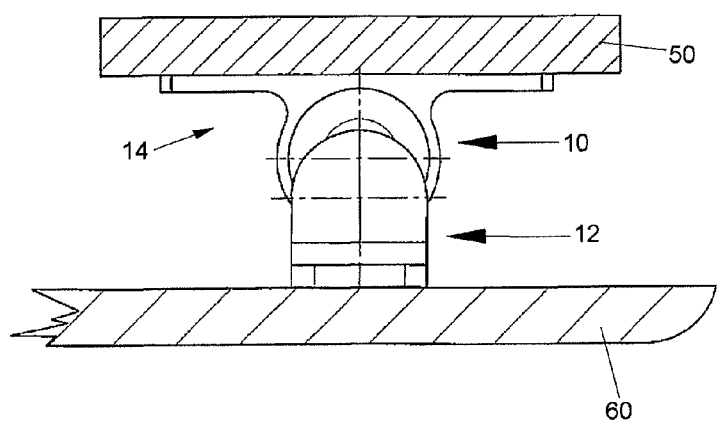
Fig. 6

HOLDING DEVICE

BACKGROUND

The invention relates to a holding device for use during the installation of a component, such as a cabin side paneling part, to be fastened advantageously vertically to a support structure, such as that of an aircraft.

In the following, such a holding device is indeed described in its use during the installation of cabin side paneling parts on the support structure of an aircraft, but such a holding device could be used anywhere that an advantageously vertically installed component is to be fastened to a support structure. The component is indeed installed advantageously vertically or upright, but the installation could also be realized differently, that is, e.g., at an angle. During the development of cabins for newer types of aircraft, such as, for example, the Airbus A350, one goal was to design elements to be fastened to the fuselage of the aircraft, such as restrooms, galleys, passenger seats, cabin power networks, cabin lighting, and air nozzles each as a complete cabin module, wherein, however, all of the connection points should be constructed as flexible, standardized interfaces and wherein simplified fastener designs should be used that allow assembly and disassembly without the use of tools (cf., the article "Cabin Development—New Approach for A350—Cabin Customization," One (magazine), German edition, Dec. 18, 2006, pg. 23). A holding device of the type named above can be used, for example, in aircraft for the fastening of parts of the cabin side paneling. Here it should be guaranteed that the standardized interfaces reliably prevent rattling noises of the components that are connected to each other. Especially during the fastening of cabin side paneling parts, the so-called panels, their fastening parts were previously pushed into a first elastomer holder from the top or bottom and then fastened in additional receptacles. In this way, the side paneling parts were typically connected to the support structure in the lower final position and for the sake of simplicity were then no longer further adjusted. This means that, for the most part, the side paneling parts made contact at the lower end stop and had been fastened so that the shock absorption of the elastomer holder was no longer effective. This situation could also not improve due to the fastening points used during the installation, because the connection at these fastening points during the installation of each side paneling part had to be found practically blindly.

SUMMARY

The object of the invention is to create a holding device of the type noted above by means of which a component, such as a cabin side panel part could be mounted more easily and more quickly on a support structure like that of an aircraft.

This objective is met starting from a holding device of the type noted above according to the invention by a hook and a ring eyelet that holds the hook, with this hook and eyelet being constructed so that they can be fastened to the support structure or the component, wherein the ring eyelet has at least one elastically resilient element for the movable, mutual support of the ring eyelet and hook.

Through the use of such holding devices, a component to be fastened, such as a cabin side paneling part, can be held during the installation in a nominal position by the support by the elastically resilient element. In this way it is guaranteed that the component is not mounted on a stop, but instead that damping elements present in the fasteners are not mounted in blocked positions and the damping tasks are reliably carried out. The advantages are simpler installation, better adjustability, and cleaner decoupling of the component. In the normal case, for each component, two holding devices according to the invention are used, in order to hold the component advantageously in a vertical position, that is, advantageously in a centered position in the Z-direction until the connection of the component is performed at all fastening points. This nominal position advantageously in the Z-direction is needed only for the installation of the component, in order to blindly find the middle and the lower connection. After locking the lower connection, the component is connected rigidly to the support structure at the middle connection after adjustment. The holding device is thus used mainly for pre-positioning the component to be fastened in a desired nominal position. Through this pre-positioning, the other holding devices that are used during the installation of a component could also be better centered. This nominal position is given by the support of the hook on the elastically resilient element of the ring eyelet or by the support of the ring eyelet with the elastically resilient element on the hook according to whether the hook is advantageously located vertically above the ring eyelet or the ring eyelet is advantageously located vertically above the hook.

Advantageous constructions of the holding device according to the invention form the subject matter of the subordinate claims.

In one construction of the holding device according to the invention, the ring eyelet is constructed as a housing that contains the elastically resilient element and has an opening for insertion of the hook. The use of such a housing allows the use of a plurality of elastically resilient elements.

In another construction of the holding device according to the invention, the opening of the housing is constructed as an elongated hole. This construction allows a free movability of the hook relative to the ring eyelet in the direction perpendicular to the vertical or Z-axis.

In another construction of the holding device according to the invention, the opening for insertion of the hook is formed in a guide element. This allows the opening for insertion of the hook in the ring eyelet to be preferably shaped according to the installation situation, for example, to provide the opening with a special inlet zone that simplifies the insertion of the hook.

In another construction of the holding device according to the invention, the guide element is made from an oscillation-damping material. During the installation, this simplifies the insertion of the hook into the ring eyelet and produces, in the installed state of the component, a desired damping effect, e.g., for preventing rattling noises. In addition, it simplifies the installation and the adjustability and provides for a cleaner decoupling of the component.

In another construction of the holding device according to the invention, the elastically resilient element is a coil spring, but in a different construction of the invention it could also involve simply an elastically deformable filler. In both cases, an elastic support of the hook in the ring eyelet is produced in a simple way.

In another construction of the holding device according to the invention, a moving pressure plate is arranged between the opening and the elastically resilient element. This provides for a uniform force transmission between the hook and the elastically resilient element of the ring eyelet.

In another construction of the holding device according to the invention, the elastically resilient element has a spring stiffness tuned to the component weight to be held or a spring stiffness turned to the part of the component weight to be held by it for positioning of the component in a nominal position according to whether the component is to be fastened more or less vertically. In this way it can be guaranteed that during the installation, the component is fastened not just in the lower position. In addition, the other fastening devices of the component could be better centered through this pre-positioning in the nominal position.

In a currently especially preferred construction of the holding device according to the invention, the spring stiffness is tuned so that the hook fastened to the component has a movability of +/−5 mm about the nominal position in an axis in which lie the ring eyelet and the hook inserted therein, advantageously the Z-axis. This movability about the nominal position is sufficient, in order to guarantee that the component is not always fastened in the lower position during the installation. In this way, it is also guaranteed even more reliably that the damping elements are not mounted in blocked positions and the damping tasks can be reliably carried out. The movability range could be selected, if needed, greater or smaller than +1-5 mm.

In another construction of the holding device according to the invention, the hook and the ring eyelet each have a mounting plate for their fastening to the support structure or the component. For example, the hook and the ring eyelet can be fastened in a simple way at a suitable position on the support structure and the component, respectively.

BRIEF DESCRIPTION OF THE DRAWINGS

Embodiments of the invention are described in detail below with reference to the drawings. Shown are FIG. 5 is the holding device according to FIGS. 1-4 in a rear view, FIG. 6 is a top view, the fastening of the holding device according to FIG. 5 on a support structure and on a component, and FIG. 7 is the holding device according to FIG. 6 in a side view.

DETAILED DESCRIPTION OF THE PREFERRED EMBODIMENTS

Figure 4:
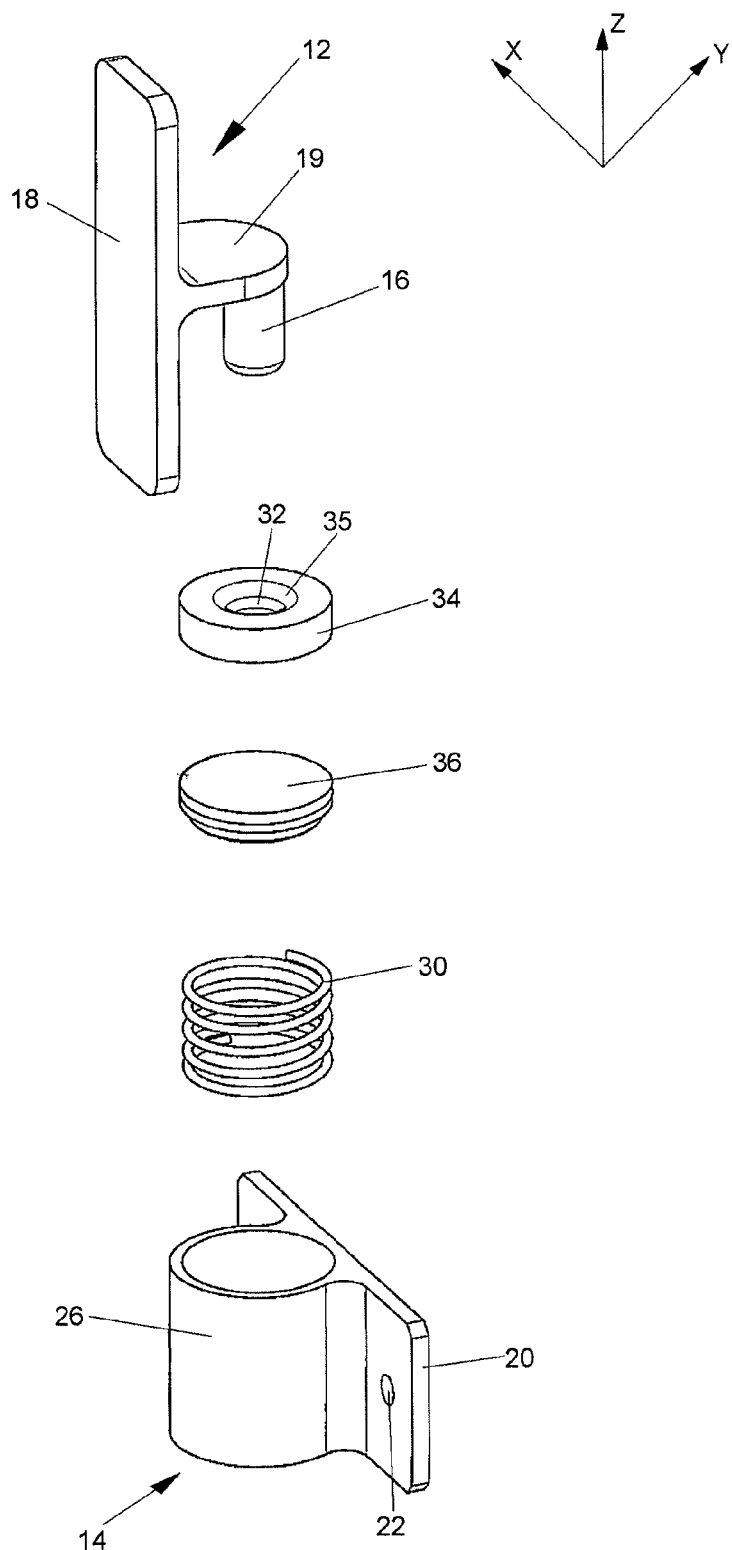
FIG. 4 is the holding device according to FIG. 3 in an exploded representation.

In FIGS. 1-7 that will now be referenced, a holding device according to the invention is designated overall with 10. According to the representation in FIGS. 6 and 7, the holding device 10 is used for the installation of a component 60 that could involve a cabin side panel part of an aircraft, wherein this component is to be fastened vertically to a support structure 50 that could involve the support structure of an aircraft. The installation of the component 60 in a position deviating from the vertical position is indeed possible, but here only the preferred installation in the vertical position is described. According to the representation in FIGS. 3 and 4, the holding device 10 comprises a hook designated overall with 12 and a ring eyelet that is designated overall with 14 and receives the hook 12, more precisely, the free end part of the hook 12 constructed as a peg 16. As shown, the hook 12 includes the mounting plate 18 on which a bracket 19 is formed that carries the peg 16, as shown in FIG. 4. The hook 12 and the ring eyelet 14 each have, for their fastening to the support structure 50 or the component 60, a mounting plate 18 and 20, respectively. The mounting plates 18 and 20 each have, in the illustrated embodiment, two mounting holes, wherein, however, only the mounting holes 22 and 24 of the mounting plate 20 of the ring eyelet 14 are shown in the drawings.

The ring eyelet 14 is formed according to FIG. 4 as a cylindrical housing 26 formed on the mounting plate 20, wherein this housing is open on the insertion side of the hook 12 and is closed by a base on the opposite side. An elastically resilient element 30 that involves a coil spring in the illustrated embodiment is arranged in the housing 26. Alternatively, it could also involve an elastically deformable filler. On the insertion side of the hook 12, the housing 26 has an opening 32. The opening 32 is formed in an annular guide element 34. The guide element 34 has an inlet zone 35 that simplifies the insertion of the peg 16 into the opening 32. The guide element 34 is made from an oscillation-damping material and thus forms an oscillation damper in a plane spanned by the X-axis and Y-axis (FIG. 4). The guide element 34 is supported in the direction toward the insertion side of the hook 12 on a ring shoulder not shown in the figures. An axially movable pressure plate 36 is arranged between the guide element 34 and the elastically resilient element 30. By means of the pressure plate 36, the hook 12 is supported on the elastically resilient element 30.

Figure 1:
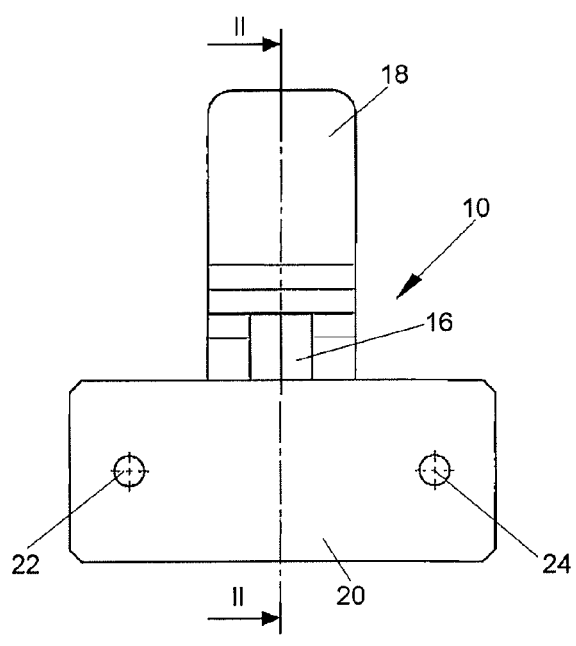
FIG. 1 is a preferred embodiment of a holding device according to the invention in a view from the front.
Figure 2:
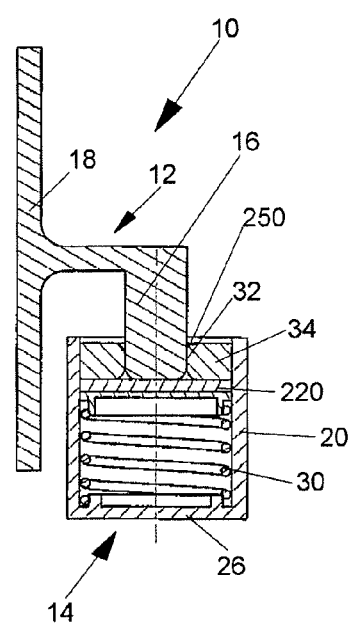
FIG. 2 is the holding device in a longitudinal-section view according to the line II-II in FIG. 1.
Figure 3:
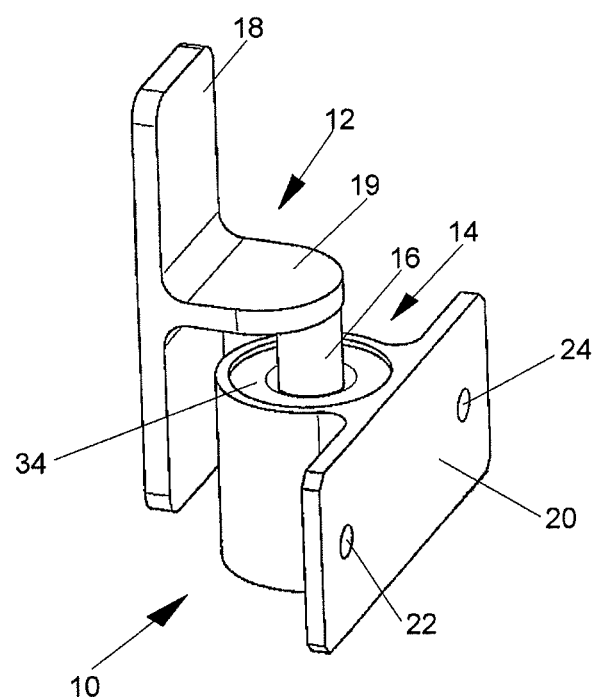
FIG. 3 is the holding device according to FIGS. 1 and 2 in a perspective representation.

The elastically resilient element 30 has a spring stiffness tuned to the component weight to be held for the positioning of the component 60 in a nominal position. Here, the spring stiffness is tuned so that the hook 12 fastened to the component 60 has a movability of +/−5 mm about the nominal position in an axis in which the ring eyelet 14 lies, more precisely, in which its housing 26 and the hook 12 inserted therein lie, in the embodiment illustrated and described here. According to the coordinate system indicated in FIG. 4, the previously mentioned axis involves the Z-axis. In FIG. 2, the nominal position is now shown, but instead the position that corresponds to Z=+5 mm. In the nominal position, the pressure plate 36 in FIG. 2 would be located at a distance of 5 mm below the guide element 34. In the position Z=−5 mm, the pressure plate 36 would be located in FIG. 2 at a distance of 10 mm below the guide element 34. If the component 60 is located in the nominal position, it is supported in an impact-damping way in the X-axis, Y-axis, and Z-axis based on the elastically resilient element 30 and the guide element 34 made from damping material. The opening 32 of the housing 26 could also be formed as an elongated hole. This allows further movability of the component 60 in the direction of the X-axis. In addition, during the installation of the component 60, its twisting is possible and, indeed, at an angle that could equal greater than 20°.

In the embodiment illustrated and described here, the ring eyelet 14 is fastened to the support structure 50 and, specifically, so that the opening 32 points upward. However, it is also possible to fasten the ring eyelet 14 to the component 60, instead of to the support structure 50, and, specifically, so that the opening 32 points downward. In this case, the hook 12 would be fastened to the support structure 50 and, specifically, so that its peg 16 points upward.

LIST OF REFERENCE SYMBOLS

10 Holding device
12 Hook
14 Ring eyelet
16 Peg
18 Mounting plate
19 Bracket
20 Mounting plate
22 Mounting hole 24 Mounting hole
26 Housing
30 Elastically resilient element
32 Opening
34 Guide element
35 Inlet zone
36 Pressure plate
50 Support structure
60 Component

The invention claimed is:

1. Holding device for installation of a component to be fastened to a support structure, comprising a hook (12) and a ring eyelet (14) that receives the hook (12), the hook and eyelet are fastenable to the support structure (50) and to the component (60), respectively, and the ring eyelet (14) has at least one elastically resilient element (30) for a movable, mutual support of the ring eyelet (14) and the hook (12), wherein the opening (32) for the insertion of the hook (12) is formed in a guide element (34), wherein the guide element (34) is made from an oscillation-damping material.

2. Holding device for installation of a component to be fastened to a support structure, comprising a hook (12) and a ring eyelet (14) that receives the hook (12), the hook and eyelet are fastenable to the support structure (50) and to the component (60), respectively, and the ring eyelet (14) has at least one elastically resilient element (30) for a movable, mutual support of the ring eyelet (14) and the hook (12), wherein the opening (32) for the insertion of the hook (12) is formed in a guide element (34), wherein the guide element (34) is made from an oscillation-damping material and the elastically resilient element (30) is a coil spring.

3. Holding device according to claim 2, wherein the elastically resilient element (30) has a spring stiffness tuned to a component weight to be held for positioning of the component (60) in a nominal position.

4. Holding device for installation of a component to be fastened to a support structure, comprising a hook (12) and a ring eyelet (14) that receives the hook (12), the hook and eyelet are fastenable to the support structure (50) and to the component (60), respectively, and the ring eyelet (14) has at least one elastically resilient element (30) for a movable, mutual support of the ring eyelet (14) and the hook (12), wherein the opening (32) for the insertion of the hook (12) is formed in a guide element (34), wherein the guide element (34) is made from an oscillation-damping material and the elastically resilient element (30) is an elastically deformable filler.

5. Holding device according to claim 1, wherein the elastically resilient element (30) has a spring stiffness tuned to a component weight to be held for positioning of the component (60) in a nominal position.

* * * * *